United States Patent [19]
Hinkley

[11] 3,803,722
[45] Apr. 16, 1974

[54] DRILLING GAUGE

[76] Inventor: Lester W. Hinkley, Box 102, Cambridge, Idaho 83610

[22] Filed: Oct. 8, 1971

[21] Appl. No.: 187,727

[52] U.S. Cl.................... 33/353, 33/185 R, 33/201, 33/387, 33/392, 33/398
[51] Int. Cl........................................B27g 23/00
[58] Field of Search.......... 33/185 R, 201, 353, 398, 33/334, 341, 387, 388

[56] References Cited
UNITED STATES PATENTS
| | | | |
|---|---|---|---|
| 659,513 | 10/1900 | Dubus | 33/353 |
| 2,245,646 | 6/1941 | Bullivant | 33/353 |
| 2,747,295 | 5/1956 | Drawdy | 33/353 |

Primary Examiner—William D. Martin, Jr.
Attorney, Agent, or Firm—John W. Kraft; Charles L. Kraft, II

[57] ABSTRACT

The present invention comprises: a body portion having a terminal side operable as a reference side for contacting drill bits; a plumb bob assembly suitably anchored to the body portion, having a plumb bob and string; a co-ordinate reference including a suitably divided abscissa scale disposed parallel to the reference side of the body portion, and an ordinate scale disposed perpendicularly to the reference abscissa scale and suitably fastened to the body portion; and a pivotally mounted level suitably secured on the body portion.

4 Claims, 7 Drawing Figures

PATENTED APR 16 1974          3,803,722

LESTER W. HINKLEY   INVENTOR.

BY

| SLOPE RATIO | DIST. PER FOOT | GAIN PER FOOT |
|---|---|---|
| 1/8 : 1 | 1-1/2 | 1/8 |
| 1/4 : 1 | 3 | 3/8 |
| 3/8 : 1 | 4-1/2 | 13/16 |
| 1/2 : 1 | 6 | 1-7/16 |
| 5/8 : 1 | 7-1/2 | 2-3/16 |
| 3/4 : 1 | 9 | 3 |
| 7/8 : 1 | 10-1/2 | 3 15/16 |
| 1 : 1 | 1 | 5 |

ALL SETTINGS TO BE MADE WITH PLUMB BOB
GAIN-PER FOOT TO BE ADDED WHEN NOT VERTICAL

LESTER W. HINKLEY   INVENTOR.

BY *John W. [signature]*

DRILLING GAUGE

FIELD OF INVENTION

The present invention relates to drilling gauges, and more particularly to drilling gauges operable for setting rock drilling bits.

DESCRIPTION OF THE PRIOR ART

Means commonly used and employed for setting drilling bits to various angles with respect to a reference point have generally employed a simple level and protractor in combination with numerous mental steps. Setting a drill bit angle to an angle other than 0° or 90°, with respect to the artificial horizon and plumb bob perpendicular, has necessitated the use of arithmetical estimates made by the driller. Generally, the apparatus used in setting drill bit angles has employed separate elements of a level and a protractor, which frequently results in wide tolerances in drill angles.

Accordingly, it is an object of the present invention to provide drilling gauge means which, by a series of geometrical, mechanical relationships, are operable to set a variety of drill angle slopes.

It is a further object of this invention to provide drilling gauge means which employ a precise, unique point of reference in setting drill slope angles.

It is another object of this invention to provide drilling gauge means which rely on a minimal number of mental steps in the use and employment of drilling gauges.

These and other objects shall become apparent from the description following, it being understood that modifications may be made without affecting the teachings of the invention here set out.

SUMMARY OF THE INVENTION

Generally, the present invention comprises: a body portion having a terminal side operable as a reference side for contacting drill bits; a plumb bob assembly suitably anchored to the body portion, having a plumb bob and string; a co-ordinate reference including a suitably divided abscissa scale disposed parallel to the reference side of the body portion, and an ordinate scale disposed perpendicularly to the reference abscissa scale and suitably fastened to the body portion; and a pivotally mounted level suitably secured on the body portion.

A more thorough and comprehensive understanding may be had from the detailed description of the preferred embodiment when read in connection with the drawings forming a part of this specification.

DETAILED DESCRIPTION OF THE PREFERRED EMBODIMENT

Figure 1:
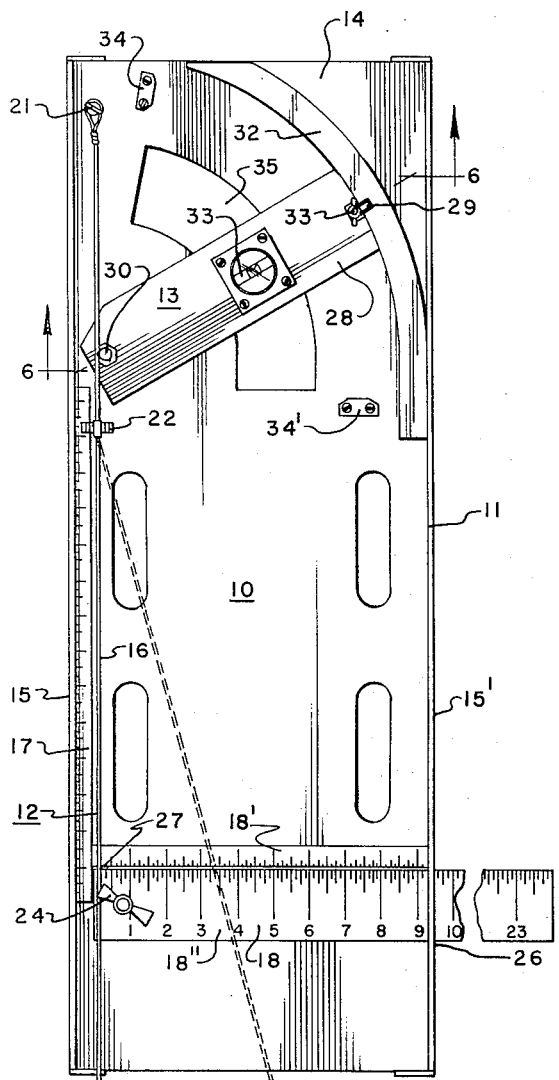
FIG. 1 is a top plan view of the drilling gauge of the present invention including the plumb bob cord disposed away from its vertical position, shown in broken lines for illustrative purposes.
Figure 2:
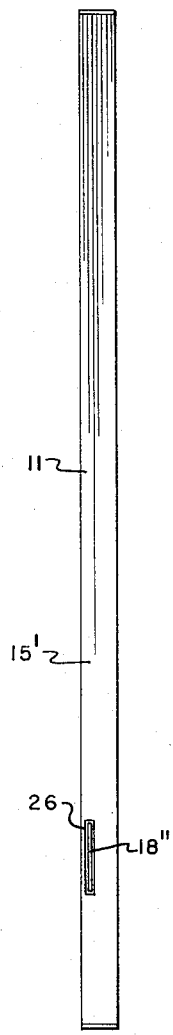
FIG. 2 is a right side elevational view showing to advantage the ordinate scale extension slot.
Figure 3:
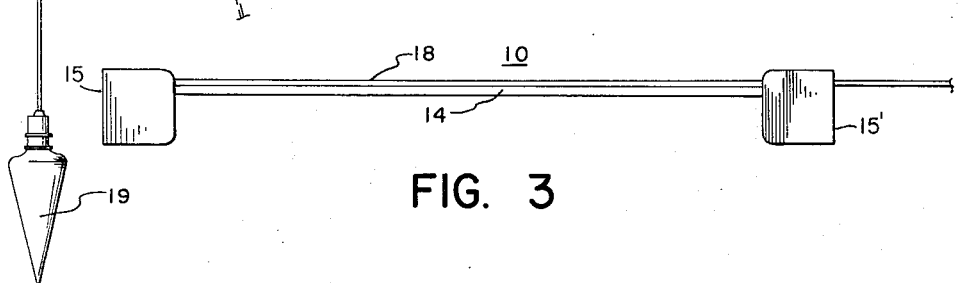
FIG. 3 is an end elevational view of the invention of the FIG. 1.
Figure 4:
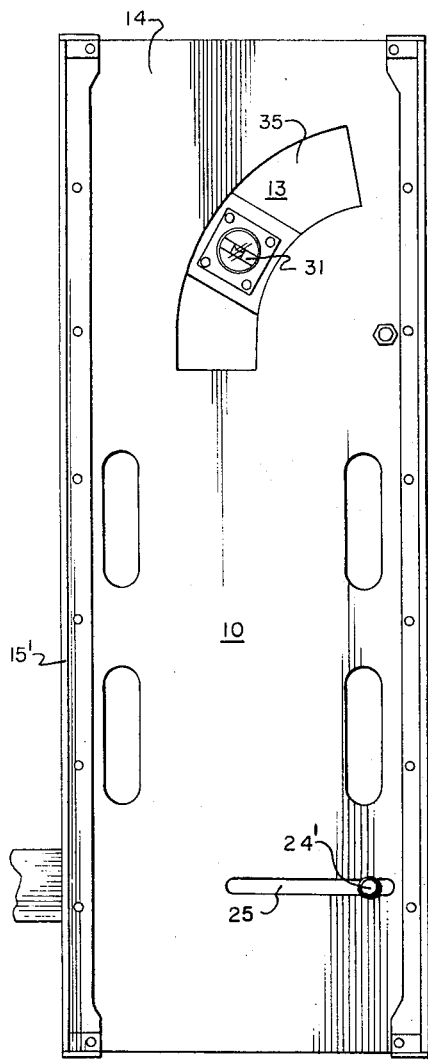
FIG. 4 is a bottom plan view of the invention of the FIG. 1.

Referring now to the drawings and more particularly to the FIGS. 1, 2, 3, 4, 6 and 7, the drilling gauge of the present invention is shown to advantage and identified by the numeral 10. The drilling gauge 10 comprises a body portion 11, a plumb bob assembly 12, and a level assembly 13. The body portion 11 is a substantially rectangular plate 14 having a pair of substantially T-shaped members 15 and 15' fastened coextensively to the rectilinear terminal side of the body portion 11. The T-shaped members 15 and 15' are rigidly fastened to the underside of the plate 14 by the substantially upstanding center leg portion of the members 15 and 15'. It is intended that the members 15 and 15' provide rectilinear support to the plate member 14, and that the outer terminal side of the crossbar portion of the T-shaped members 15 and 15' provide a reference datum surface against which a drill bit 36 may be contacted by the drilling gauge 10.

Referring now to the FIG. 1, the plumb bob assembly 12 is disposed on the uppermost terminal side of the body portion 11. The plumb bob assembly 12 includes a plumb bob cord 16, an abscissa scale 17, and an ordinate scale 18. The plumb bob cord 16 comprises a commonly known plumb bob 19 and plumb bob string 20 fastened to an anchor bolt 21 disposed distally from one of the corners of the body 11. A plumb bob string reference guide 22 is disposed opposite the anchor bolt 21. The reference guide 22 is operable to selectively position the point of pivot of the plumb bob cord 16. Means to selectively move and lock the point of pivot of the plumb bob cord 16 may be a track disposed parallel to the side member 15.

The abscissa scale 17 is a suitably divided scale disposed distally between the terminal ends of the body portion 11, and is carried parallel to the terminal side carrying the plumb bob cord 16. In this embodiment, the abscissa scale 17 is fastened on the rectilinear side of the body portion 11 having the T-shaped member 15. The ordinate scale 18 is disposed transversely at a predetermined position distally from the terminal end opposite the anchor-carrying terminal end of the body 11. The ordinate scale is comprised of two scales 18' and 18''. The first scale 18' is fixedly mounted on the body 11, and intersects the abscissa scale 17 at a right angle. The scale 18'' is a slidably carried scale which may be secured by a wing nut 24 disposed at its terminal end closest to the abscissa scale 17 and operable to be slidably moved. A wing nut bolt 24' may be carried in a slot 25 provided in the body portion 11 rectilinearly with respect to the ordinate scale 18. A slot 26 is provided in the T-shaped member 15' of the body 11 to permit the scale extension 18'' to project through the side member 15'. The predetermined position at which ordinate scale 18 intersects the abscissa scale 17 may be called the origin 27. The origin 27 is the reference point from which the co-ordinate distances are calculated in order to form the slope triangles hereinafter later described.

Disposed on the body portion 11 is a pivotally mounted, selectively secured level assembly 13. It is to be understood that, while the preferred embodiment describes a level assembly 13 disposed at a preselected distance from the origin 27 on the abscissa scale 17, the level assembly 13 may be disposed at any of a number of positions on the body portion 11. The level assembly 13 is comprised of a level arm 28 and an arcuately carried locking means 29. The level arm 28 is carried on the body portion 11 by a pivot means 30.

The level arm 28 may be a suitably configured bubble type level 31 disposed rectilinearly with respect to the level arm 28. The arcuately carried locking means 29 includes a curved track 32, having its locus at the level arm pivot 30, and a locking nut 33 carried on the level arm 28. The level arm 28 may be positioned on the curved track 32 by means of a locking nut 33, to selectively secure the level arm 28 on the track 32. The level assembly 13 may be provided with a pair of upstanding studs 34 and 34' positioned at zero and ninety degrees with respect to a plumb line vertical. The level assembly 13 may also be provided with an opening 35 cut in the body portion 11, operable to provide light and visual contact with the bubble type level 31.

Figure 7:
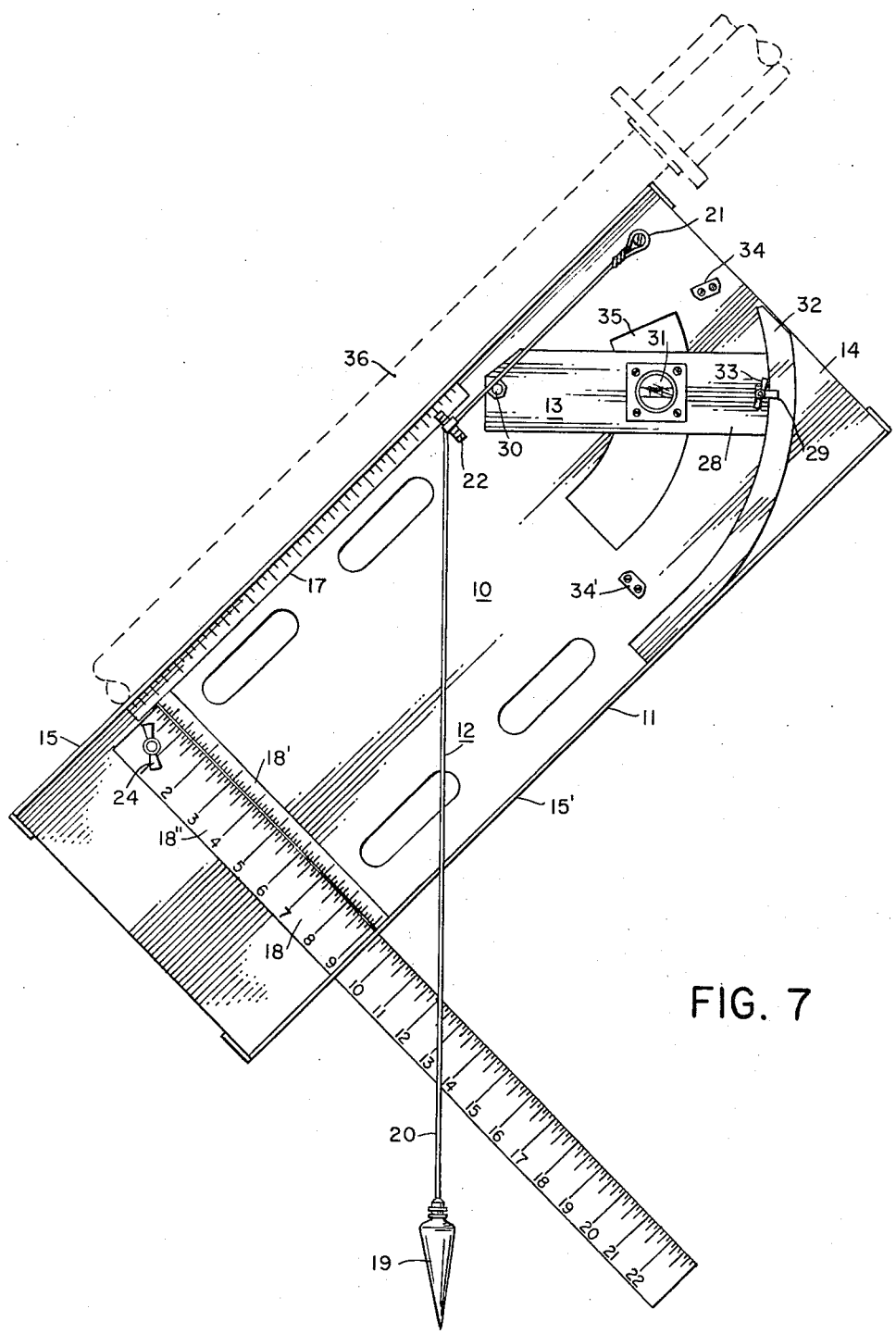
FIG. 7 is a front elevational view of the drilling gauge shown as it would appear in operation in contact with a drilling member or similar apparatus shown in broken lines for illustrative purposes.

Referring to the FIGS. 1 and 7, the drill bit slope is represented by the angle of the abscissa scale 17 and the plumb bob cord 16. The slope is defined by a right triangle whose co-ordinates are given by the length of the abscissa scale 17 and the perpendicularly disposed ordinate scale 18. In operation, the body 11 is held vertically with respect to the rectilinear axis of the body portion 11. The plumb bob reference guide 22 is then suitably positioned on the abscissa scale 17 of the plumb bob assembly 12. The body portion 11 is rotated such that a free-swinging plumb bob cord 16 will cross the ordinate scale 18 at a predetermined point. While holding the gauge 10 in this configuration, the level assembly 13 is pivoted until the level 31 registers a level horizon. It is to be understood that the reference point in space defined by the plumb bob assembly 12 and the level assembly 13 is a unique one. To properly set the angle of a drilling bit, the drill bit or shaft 36 is rotated with respect to its vertical axis until the pitch of the bit matches the pitch of the side member 15.

Figure 5:
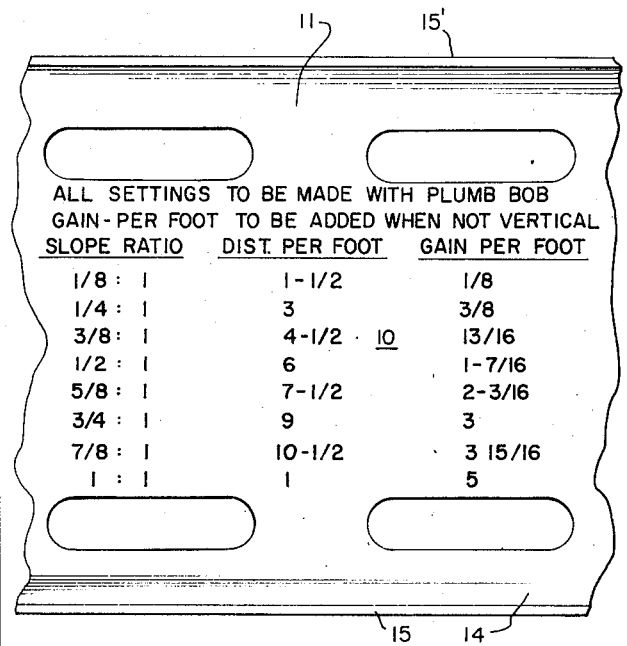
FIG. 5 is a fragmentary view, drawn to a larger scale, of one of the terminal sides of the drilling gauge, showing to advantage a setting table which may be used in the operation of this invention.
Figure 6:
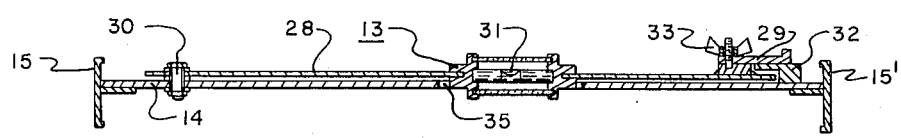
FIG. 6 is a cross-sectional end elevational view taken substantially along the lines 6—6 of the FIG. 1, showing the construction of the level and plumb bob assembly.

Referring now to the FIG. 5, a means of determining the displacement of the plumb bob string 20 from the origin 27 on the ordinate scale 18 for most typically used bit slopes may be marked on the body plate portion 14, as shown to advantage in the table in the FIG. 5. For example, a slope of three-quarter to one requires a displacement on the ordinate scale 18 of a distance of 9 inches per 12 inches of the abscissa scale 17. The slope of three-quarter to one is represented by the angle of the abscissa scale 17 and the plumb bob cord 16.

Important in drilling, particularly of deep drilling, is the length of cut of the drill bit 36 for a given vertical depth. Therefore, in the column, of the table in the FIG. 5, marked "Gain Per Foot", settings representing the derivative of the drill length for a given cut are shown. In terms of the drilling gauge 10, the length of cut is represented by the hypotenuse of the right triangle defined by the plumb bob cord 16, abscissa scale 17, and ordinate scale 18. Referring to the example set out above for a slope of three-quarter to one, the gain per foot, or derivative, for each foot of length is 3 inches. If the depth of cut is 40 feet, the hypotenuse of a three-quarter to one slope triangle is 50 feet. For each foot of change, 3 inches are gained, or 10 feet over the total.

It is to be understood that, while the standard on which the abscissa scale 17, ordinate scale 18, and table set out above has been described in terms of the English foot unit of measure, any of a variety of other standard indicia may be used to advantage. It is to be understood that this invention is operable under the metric unit system.

Having thus described in detail a preferred apparatus which embodies the concepts and principles of the invention and which accomplishes the various objects, purposes and aims thereof, it is to be appreciated and will be apparent to those skilled in the art that many physical changes could be made in the apparatus without altering the inventive concepts and principles embodied therein. Hence, it is intended that the scope of the invention be limited only to the extent indicated in the appended claims.

I claim:

1. A drilling gauge comprising:
   a body portion having a terminal side operable as a reference side for contacting drill bits;
   a plumb bob assembly suitably anchored to said body portion, having a plumb bob and string;
   a co-ordinate reference, including a suitably divided abscissa scale disposed parallel to said reference side of said body portion, and an ordinate scale disposed perpendicularly to said reference abscissa scale and suitably fastened to said body portion;
   a pivotally mounted level suitably secured on said body portion, and
   means for selectively changing the point of pivot of said plumb bob with respect to said abscissa scale.

2. A drilling gauge comprising:
   a body portion having a terminal side operable as a reference side for contacting drill bits;
   a plumb bob assembly suitably anchored to said body portion, having a plumb bob and string;
   a co-ordinate reference, including a suitably divided abscissa scale disposed parallel to said reference side of said body portion, and an ordinate scale disposed perpendicularly to said reference abscissa scale and suitably fastened to said body portion;
   a pivotally mounted level suitably secured on said body portion; and
   said reference ordinate scale comprising a pair of parallelly disposed scales, one fixedly mounted to said body portion, and the other said scale, similarly divided, provided with slidable adjustment means.

3. A drilling gauge comprising:
   a body portion having a terminal side operable as a reference side for contacting drill bits;
   a plumb bob assembly suitably anchored to said body portion, having a plumb bob and string;
   a co-ordinate reference, including a suitably divided abscissa scale disposed parallel to said reference side of said body portion, and an ordinate scale disposed perpendicularly to said reference abscissa scale and suitably fastened to said body portion; and a pivotally mounted level suitably secured on said body portion, said level including an arcuately carried locking means to fasten said level to a selected fixed position on its pivot arc.

4. The apparatus of claim 3, including studs operable to restrict the arc of said level to predetermined positions in said arc.

* * * * *